Dec. 22, 1964  T. H. EYLES  3,162,703
INJECTION MOLDING OF FOAM MATERIALS
Filed Dec. 6, 1960  2 Sheets-Sheet 1
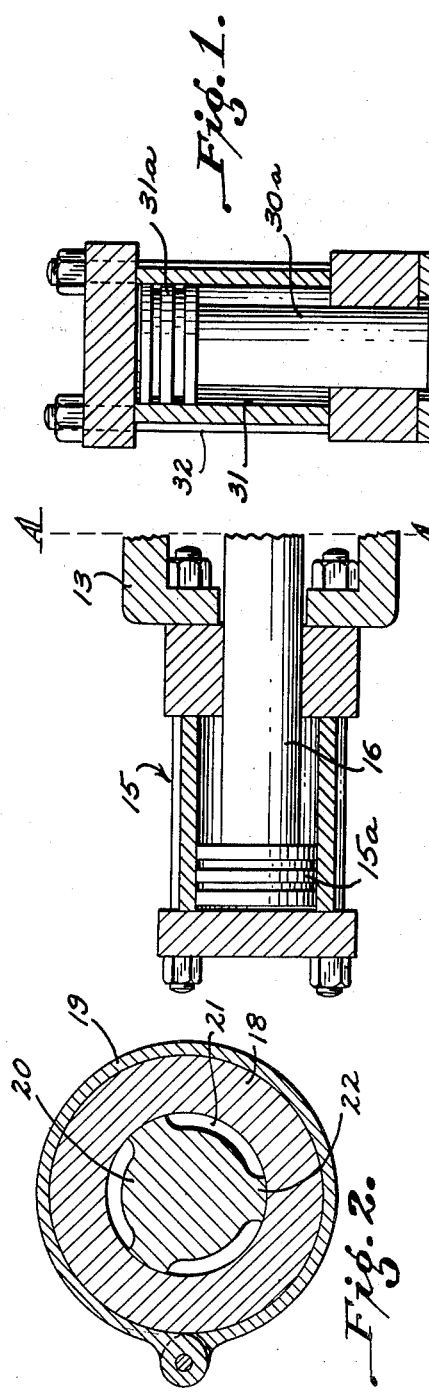
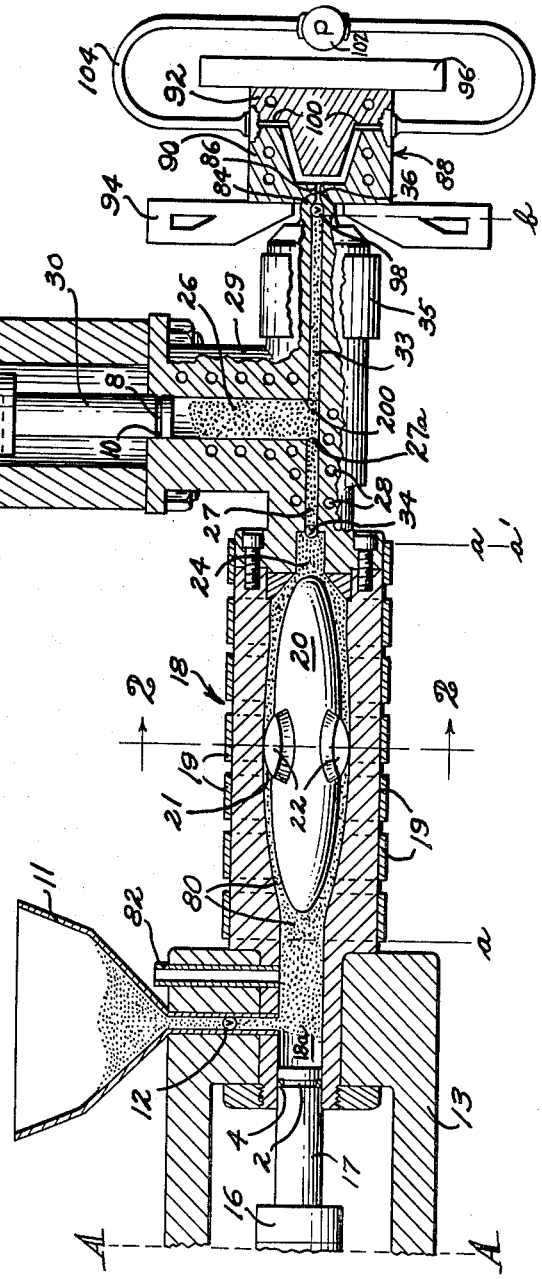
INVENTOR
*Thomas H. Eyles*
BY *Leon R. Horne*
*Stanley Sacks*
ATTORNEYS United States Patent Office 3,162,703
Patented Dec. 22, 1964

3,162,703
INJECTION MOLDING OF FOAM MATERIALS
Thomas H. Eyles, Leominster, Mass., assignor to Foster Grant Co., Inc., Leominster, Mass., a corporation of Delaware
Filed Dec. 6, 1960, Ser. No. 74,080
2 Claims. (Cl. 264—51)

This invention relates to an improved method for injection molding expandable thermoplastic resinous compositions and improved injection molding apparatus therefor and to the molded articles thereby formed, said articles being uniformly porous, multicellular, solidified foam-like formed structures of uniform density.

More particularly, this invention relates to the injection molding of uniformly porous, multicellular, solidified foam-like shaped structures of uniform density from solid thermoplastic benzene-soluble polymers and copolymers of polymerizable aromatic compounds of the benzene series having the vinyl radical bonded directly to a carbon atom of the aromatic nucleus and nuclear halogenated derivatives thereof. Among such monovinyl aromatic compounds are styrene, vinyltoluene, vinylxylene, ethylvinylbenzene, para-chlorostyrene, meta-chlorostyrene, para-isopropylstyrene, para-bromostyrene, and ethylvinyltoluene. Also contemplated within the scope of this invention are copolymers of any two or more of the foregoing monovinyl aromatic compounds, polymethylmethacrylate, copolymers of methylmethacrylate and styrene, copolymers of styrene and alpha-methylsyrene, graft copolymers and polymers with which have been compounded other modifying agents, i.e. polystyrene containing a small amount of rubber. Likewise contemplated within the scope of this invention are other hydrocarbons, such as polyethylene, polypropylene, polyisobutylene and their mixtures.

Prior hereto, there have been available several methods, and apparatus therefor, for injection molding a thermoplastic resinous composition to form a porous or cellular object having the rigidity of sponge rubber or the like. One such method includes the steps of preparing a mixture of a gas-expandable molding material having gas-producing material intermixed therewith, reducing the volumertic capacity of the mold cavity into which the mixture is to be injected, thereafter injecting said gas-expandable molding material having the gas-producing material, or foaming or blowing agent, into the mold cavity while the volumetric capacity of it is reduced, then increasing the volumetric capacity of said mold cavity by changing the position of a wall portion thereof with respect to its remaining wall portions while maintaining the mold cavity closed, and causing the so-injected molding material to be expanded by the intermixed foaming agent into a porous or cellular condition in the so-expanded mold cavity. The foregoing is described in U.S. Patent No. 2,530,289.

Also, a known apparatus for forming foamed rubber or latex articles of the type having an array of open cavities, such as auto seat cushions, by injection molding includes a mold assembly comprising separable sections and pins with domed, inner ends carried by one of said sections so as to extend into the mold when closed, at least one of said pins being tubular, with its interior being accessible from outside of the mold, and a resilient cap in the inner end of said one of said pins having an opening constituting a check valve to resist fluid flow outwardly of said mold. The latex injected into the mold is foamed latex. The foregoing is described in U.S. Patent No. 2,700,178.

Another method for injection molding a thermoplastic resinous composition to form a porous or cellular shaped article is one in which use is made of a standard injection molding machine having the ordinary loading ram or plunger reciprocally movable in the material filling chamber having opening thereinto a material feed opening from the feeding hopper. This method however requires that said injection molding machine include, in combination with said loading ram or plunger, a plunger prepositioning means for prepositioning said ram or plunger to seal said material feed opening in said material filling chamber immediately after the material has been added to said filling chamber. As is well known, injection molding is generally carried out with a resin in granular or particulate form as starting material, and the granular resin particles are delivered under mechanical pressure to a heating zone wherein the resin becomes fluid. This fluid resin then is forced into the mold cavity to form the desired shaped object upon cooling therein. In the heating zone wherein the most efficient heating takes place there is positioned a solid spreader or torpedo. Said method is carried out by charging granular expandable thermoplastic resinous material containing a blowing agent incorporated in the granules into the dischargeable injection chamber of the apparatus, such as a piston or plunger discharged injection cylinder, there being movably positioned in said chamber a plunger having a prepositioning means in combination therewith; then, in intermittent molding cycles sequentially prepositioning the plunger immediately to seal the material feed opening of said chamber, forcing said material under pressure into and through a first cold zone in said chamber or cylnder to compact at least a portion of said material therein in solid, granular form while maintaining said material beneath its foaming temperature; then forcing said material through to a second zone which is heated and is adjacent to said first zone and heating said material to a flowable condition under heat in said second zone to attain a foaming temperature; and then forcing said so-heated flowable material to a discharge zone in said chamber from which a portion of said heated flowable mass is injected into a mold to form a molded foam structure, the solid, compacted portion of said material mass in said first zone continuously maintaining the heated flowable portion of said material mass in said second zone under pressure to restrain substantial foaming therein throughout the intermittent molding cycles. As is clearly obvious, by prepositioning the plunger or loading ram, the mass of expandable polymeric resin is trapped in said chamber and held under pressure by said plunger while being heated. If the plunger be not so prepositioned to seal completely the feed opening into the chamber or cylinder, there will be an excessive loss of blowing or foaming agent and exudation of the material from the chamber back out said feed opening. In addition, the mold into which the flowable fluid thereby formed is injected is vented and, in some cases, is made expandable on the order of the expandable mold hereinabove described, and failure to vent the mold properly results in unsatisfactory molded shapes. Undesirable gas loss may occur between shots when the prepositioned plunger is withdrawn to allow additional material to be charged to the extruder. Attempts have been made, using said method and apparatus, to injection mold expandable thermoplastic resinous materials such as polystyrenes and styrene copolymers, among other polymers of alkenyl aromatic compounds having the general formula Ar—CR=CH$_2$ wherein Ar is an aromatic compound and R is either a hydrogen atom or a methyl radical.

The patentably novel injection molding apparatus of this invention includes a chamber into which a thermoplastic resinous material composition in particulate or granular form having a foaming agent incorporated therein is passed. Said chamber opens into and is coaxially aligned with a chamber into which said material is passed and in which said material is heated, to soften or warm same slightly. The temperature and pressure conditions are so controlled in said heating chamber that said material merely becomes warmed or softened. Said heating chamber opens into a filling conduit axially aligned therewith, and said filling conduit opens into an injection chamber or accumulation chamber positioned transversely with respect to said filling conduit. Said injection chamber opens into, at the bottom thereof, an injection conduit transversely positioned with respect to said injection chamber, and said injection conduit opens into a nozzle, which, in turn, is in communication with an injection mold. At the entry opening of the filling conduit from the heating chamber is positioned preferably a hydraulically operated valve. Positioned in the chamber into which said granular material is passed is a double-acting hydraulically operated loading ram or plunger axially reciprocally movable therein, and reciprocally movably positioned in said injection chamber or accumulation chamber is a hydraulically operated injection ram. Said injection ram is positioned in slip-fit relation with said injection chamber, viz. the diameter of said ram is preferably from 0.0002 inch to 0.0004 inch smaller than the diameter of said injection chamber. Both the loading ram and the injection ram may be fitted with conventional resilient frictional members to aid in preventing gas escape. Means are provided for heating said filling conduit, said injection chamber and said injection conduit. In said filling conduit, said injection chamber, and said injection conduit the softened material passed thereinto from the aforementioned heating chamber is under such predetermined temperature and pressure conditions that the previously softened or warmed resinous material assumes the physical state of a mobile gel without any accompanying expansion of the foaming or blowing agent, and, when the foaming or blowing agent becomes activated, the mobile gel having said blowing agent incorporated therein is confined or sealed in said injection or accumulation chamber and said injection conduit under the pressure of said ram, and this sealing or confinement is accomplished by the closing of the hydraulically operated valve positioned at the opening of said filling conduit into said heating chamber, the hydraulically operated valve at the nozzle tip remaining closed. The so-confined or sealed-in mobile gel having the unexpanded blowing agent incorporated therein is caused to reach the molding temperature of the resinous material within an extremely short period of time without any accompanying changes in its physical state and without any accompanying expansion of the blowing agent and, upon the reaching of said molding temperature, the hydraulically operated valve at the nozzle tip opens with the simultaneous movement of the injection ram against the material resulting in the movement of said material from the accumulation chamber and injection conduit through the nozzle as a mobile gel into the mold wherein said material expands under the action of said blowing agent to assume the shape of said mold which is under a pressure lower than atmospheric and such to prevent the removal of the so-expanded blowing or foaming agent from the so-shaped porous, multicellular, solidified, foam-like structure which is rigid even though foam-like. This patentably novel injection molding apparatus includes hydraulic control means for operating the loading ram or plunger, the injection ram, and the hydraulically operated valves in timed relation with each other.

The patentably novel method of this invention is one for forming a porous, multicellular, solidified foam-like structure which is rigid from a molding grade thermoplastic resinous composition including a thermoplastic resin and a foaming or blowing agent in admixture therewith, said resinous composition being in particulate or granular form and of molding grade type. Preformed expandable beads can be used, or the resin can be blended or mixed with the foaming or blowing agent in carrying out the method. More specifically, the method is an intermittent molding cyclic method comprising sequentially warming or softening in one zone said resinous composition without any accompanying expansion of said blowing agent, causing at least a portion of said so-softened or so-warmed composition to pass into an accumulation zone without expanding said foaming or blowing agent, heating said so-softened composition under such temperature and pressure conditions that said resinous composition assumes the physical state of a mobile gel without any accompanying expansion of the foaming agents and, when the so-formed mobile gel reaches a temperature at which the foaming agent will begin to expand in said accumulation zone under a predetermined pressure, sealing said accumulation zone from said one zone, thereby confining said so-heated mobile gel within said accumulation zone under said predetermined pressure, heating said mobile gel in said so-confined accumulation zone to the molding temperature of said resinous composition without any accompanying expansion of said foaming or blowing agent, and then causing said so-formed and so-heated mobile gel to expand into a mold which is evacuated to a predetermined pressure lower than atmospheric pressure such that the resinous material expands therein, and the gaseous blowing agent is not completely removed from the so-formed foam-like structure. The thermoplastic resinous material is, of course, passed from a feeding hopper into a chamber wherein it is compacted and passed into the zone wherein it is warmed or softened.

Of particular note here with respect to this invention, it is not necessary at any time whatever to seal the feed opening from the hopper into the said chamber, from said chamber, and to have available, in combination with the plunger or loading ram movable in said chamber, a prepositioning means therefor. In addition, it is not necessary here to trap in one continuous zone granular and compacted resinous composition in contact with molten or flowable composition thereby to cause said solid, compacted portion in the first zone of said chamber to maintain continuously the heated or molten or flowable portion in the adjacent second zone of said chamber under pressure to restrain expansion of the blowing or foaming agent and to prevent accompanying foaming of the molten or flowable portion during the intermittent molding cycles. Thusly, in this invention, there is not any possibility whatever of any loss of blowing agent and exudation of the resinous composition from the chamber back out the feed opening. Thusly, is there formed here for the first time from thermoplastic resinous material having a foaming or blowing agent incorporated therein an injection molded uniformly porous, multicellular, solidified foam-like shaped thermoplastic resinous material structure of uniform density and of substantial rigidity, such as a shaped insulated container.

The blowing or expanding or foaming agents incorporated in the thermoplastic resinous material here molded in the apparatus and utilized in carrying out the method of this invention can be a gas which expands upon release of pressure to foam the resin, a liquid which will vaporize to a gas and expand the resin upon release of pressure, a solid which on decomposition releases a gas, i.e. an ammonium or azo type compound, such as ammonium carbonate, ammonium bicarbonate, potassium bicarbonate, diazoaminobenzene, diazoaminotoluene, azodicarbonamide, diazoisobutyronitrile, etc., or combinations of such gases, liquids, and solids. Examples of suitable normally gaseous agents which can be used are paraffins such as propane or butane or mixtures thereof, or cracked petroleum fractions. Similarly, olefins such as ethylene, propylene, butylene, etc., and mixtures thereof can be used to advantage. Suitable normally liquid blowing or expanding agents include methyl chloride, higher paraffins such as pentane or hexane, freons, water, etc. In addition, more permanent gases such as carbon dioxide, nitrogen or air can be used. In the apparatus of this invention and in carrying out the method of this invention temperatures above the critical temperature of the blowing or foaming agent used can be used in producing the aforedescribed and hereinafter disclosed and claimed foam-like structure of uniform density.

The amount of expanding or foaming agent used depends upon the volume of gas it will generate and the foam density desired. Preferably, the amount of the expanding agent ranges from 1% to 15% by weight, based on the combined weight of the resin and the expanding agent.

An object of this invention is to provide an injection molding apparatus for molding a uniformly porous, multicellular, solidified foam-like structure of uniform density which is rigid from a thermoplastic resinous composition in particulate or granular form having a foaming agent incorporated therein.

Another object of this invention is to provide a method for injection molding a uniformly porous, multicellular, solidified foam-like structure of uniform density which is rigid from a thermoplastic resinous composition in particulate or granular form having a foaming agent incorporated therein.

Still another object of this invention is to provide an injection molded uniformly porous, multicellular, solidified foam-like shaped thermoplastic resinous material structure of uniform density from a thermoplastic resinous material having a foaming agent incorporated therein.

Other objects and features of this invention will become readily apparent from the following detailed description which is illustrative of the preferred embodiment of this invention.

FIG. 1 is a longitudinal vertical cross-sectional view of the injection molding apparatus of this invention.

FIG. 2 is a section taken on line 2—2 of FIGURE 1.

Figure 3:
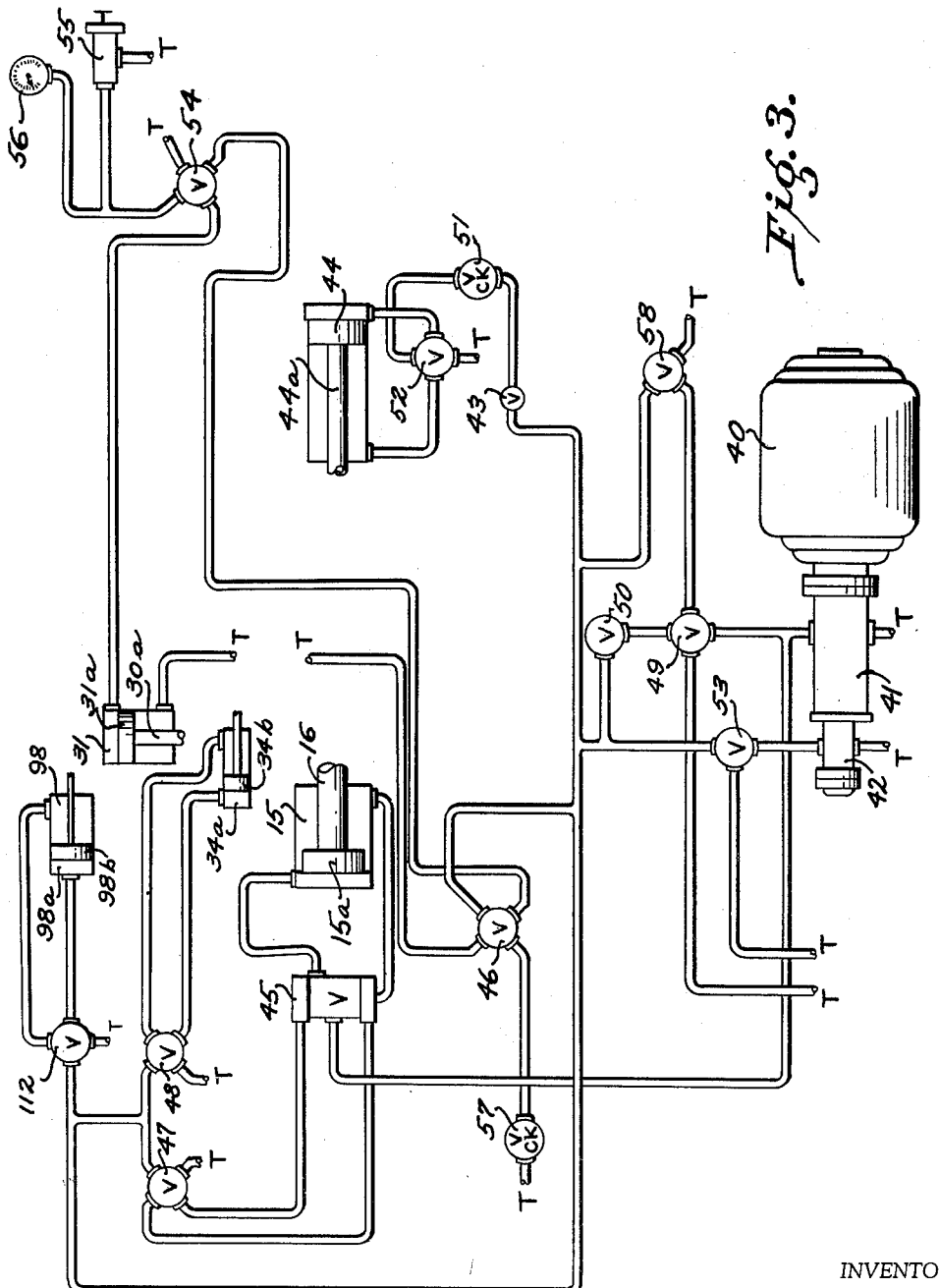
FIG. 3 is a schematic diagram of the hydraulic and control circuit of the injection molding apparatus of FIGURE 1.

More specifically, the extended longitudinal horizontal frame 13 supports at one end thereof hydraulic cylinder or chamber 15 having hydraulic ram 15a reciprocally movable therein. Connected to ram 15a is fixed rod 16 terminated by loading ram or plunger 17 which is movable in filling or material receiving chamber 18a. Mounted directly above and connected with chamber 18a is hopper 11 having volumetric control 12, chambers 15 and 18a being separated and apart but coaxially aligned. Numeral 82 indicates an expanding or foaming agent inlet to chamber 18a. If inlet 82 is used, the top of hopper 11 must be enclosed with a gas tight cover. If the resin in the form of foamable beads is used, inlet 82 is closed. Ram 15a, rod 16 and ram or plunger 17 are effectively a single unit with the result that movement of ram 15a in hydraulic cylinder or chamber 15 causes like movement of ram or plunger 17 in filling chamber 18a, plunger 17 being movably positioned in chamber 18a and being in slip-fit relation with chamber 18a, that is, the outer diameter of plunger 17 is from 0.0002" to 0.0004" less than the inside diameter of chamber 18a. Preferably there is peripheral groove 2 in plunger 17 in which is positioned the O ring 4 for aiding in the prevention of gas leakage, as clearly shown in FIG. 1. Instead, if desired, the wall of chamber 18a may have a peripheral groove to receive an O ring. Also, chamber 15 is provided with hydraulic connections and controls shown in FIGURE 3.

Material receiving chamber 18a is an integral part of heating block 18 and is coaxially aligned with and connected to heating chamber 80 in heating block 18 having therein solid spreader 20 supported by sections 22 to form spreader passages 21 therearound. Heating block 18 is provided with electrical heating strips 19 to heat the molding grade granular or particulate resinous material in chamber 80 to a temperature at which said material becomes warm or softened without any accompanying expansion of the foaming agent. Coaxially aligned with chamber 80 is tubular conduit 24 which is likewise heated by heating strips 19 and is axially aligned with and coextensive with filling conduit 27, formed from integral base block 29 attached to heating block 18. The material in heating chamber 80, as defined more particularly by lines a—a, is warm or softened but in the solid state.

Integral base block 29 supports tie bar frame 32 having associated therewith hydraulic cylinder 31, said frame 32 and, of course, said cylinder 31 being positioned substantially transversely with respect to filling conduit 27. Hydraulic ram 31a is positioned in and reciprocally movable in cylinder 31, said ram 31a being coaxially aligned with and connected to transversely positioned injecting ram 30 by piston rod 30a. As is clearly shown in the appended drawings, injection ram 30 is movable within injection or accumulation or preplasticizer chamber 26, formed from the base block 29. The outer diameter of injection ram 30 is from 0.0002" to 0.0004" smaller than the inner diameter of injection chamber 26 and thus is in slip-fit relation thereto thereby forming a substantial seal with chamber 26 but still movable therein. However, there is preferably a peripheral groove 8 in the injection ram 30 in which is positioned O ring 10 for aiding in the prevention of gas leakage, as clearly shown in FIGURE 1. Instead, if desired, the wall of chamber 26 may have a peripheral groove to receive an O ring. Action of ram 31a in hydraulic cylinder 31 causes similar action of ram 30 in chamber 26. Ram 30 in its down position will stop at point 200. Filling conduit 27, as is clearly shown in the appended drawings, leads from valve 34, which is preferably hydraulic operated, to orifice 27a. The lower portion of accumulation chamber 26 communicates with injection conduit 33 which is substantially transversely positioned with respect to accumulation chamber 26, conduit 33 likewise being formed from integral block 29 and preferably coaxial with respect to filling conduit 27, as clearly shown in FIGURE 1. Connected to injection conduit 33 is nozzle 84 having nozzle orifice 36 communicating with fill gate 86 of mold 88 consisting of die plates 90 and 92 supported on platens 94 and 96, respectively, said platens being slidably mounted (the specific structure therefor not shown). Positioned in said nozzle 84 at the nozzle orifice 36 thereof is hydraulically operated valve 98. Valve 98 may be positioned in the mold itself if desired. Throughout block 29 are positioned a plurality of spaced apart electrical cartridge heaters 28, and the nozzle side of block 29 is in the form of a protruding section covered with an electrical heating band 35. Connected to mold 88 at passages 100 formed between die plates 90 and 92 when closed is vacuum pump 102 through line 104. Upon closing of said die plates 90 and 92 to receive material to be shaped, pump 102 is caused to operate to evacuate the mold cavity, which is so shaped to form a drinking container structure, as clearly shown in the appended drawings, so that said mold cavity is under a pressure of from about 8.8 to about 9.8 pounds per square inch.

By way of example, and not by way of limitation, the following example is given.

General purpose molding grade polystyrene beads blended with 8% pentane by weight, based on the combined weight of polystyrene and pentane, are used. The general sequence of operations is as follows:

The resinous composition in the apparatus between lines a—a is in the soft or warm state, and the composition in the apparatus between lines a'—b, line a' being an extension of line a, as shown on the appended drawing, is in the state of a mobile gel. The temperature of the zone soft or warm material in the apparatus between lines a—a ranges from about 180° F. at the opening into chamber 80 to about 220° F. at that portion of chamber 80 opening into tubular conduit 24. The temperature of the material in the state of a mobile gel in the apparatus between lines $a'-b$ is about 300° F., having been heated to that temperature from about 220° F., which is the temperature of the softened or warmed beads at the time same entered filling conduit 27. When the temperature of the mobile gel, which is under pressure, in injection chamber 26 approaches about 300° F. and when the blowing or expanding agent pentane is at a point at which it is about to expand, hydraulically operated valve 34 is closed, mold platens 94 and 96 and the respective die plates 90 and 92 are closed, vacuum pump 102 is actuated to evacuate the mold cavity to a pressure ranging from about 8.8 to about 9.8 p.s.i., and injection ram 30 is caused to move downwardly for a controlled period of time to exert a pressure of about 1000 p.s.i. on the mobile gel. The polystyrene in its physical state as a mobile gel is thusly confined within accumulation chamber 26 and injection conduit 33 between injection ram 30, hydraulically operated valve 34 and hydraulically operated valve 98 under at least a pressure of about 1000 p.s.i., and upon the mobile gel within aforesaid volume attaining the temperature of about 300° F., injection ram 30 is driven downwardly at about 1000 p.s.i. and hydraulically operated valve 98 is simultaneously opened with the result that the polystyrene in its physical state as a mobile gel is passed without any accompanying expansion of the blowing or foaming agent therein through nozzle 84 and its nozzle orifice 36 as such mobile gel into the partially evacuated mold cavity of closed mold 88 wherein it expands and assumes the uniformly porous, multicellular, solidified foam-like shaped structure of uniform density without any loss of blowing agent and without any exudation of the polystyrene from any portion of the apparatus except at said nozzle orifice 36 into said mold cavity, as desired. After injection ram 30 reaches its bottom position at 200, a holding pressure of about 1000 p.s.i. is applied and hydraulically operated value 98 is closed. Plunger 17 is then caused to push forward with a pressure of about 1500 p.s.i., and simultaneously hydraulically operated valve 34 is opened, to cause warmed or softened polystyrene beads to go from heating chamber 80 and through spreader passages 21 therein, through filling conduit 27 until filling conduit 27, accumulation chamber 26 and injection conduit 33 are filled with said polystyrene. After filling of said spaces, the pressure of plunger 17 causes the polystyrene to exert back pressure on injection ram 30 which is continuously maintained at 1000 p.s.i., sufficient to force injection ram 30 into its uppermost position, as shown clearly in FIGURE 1. When injection ram hits its predetermined uppermost position it stops its motion, and plunger 17 is then caused to recede.

The actuating and control elements for this sequence of operations are hereinafter described.

The actuating and control elements and the relationships therebetween are illustrated in the hydraulic circuit shown in FIG. 3. Pipe endings T all go into the oil reservoir (not shown), and the hydraulic system is always full. Motor 40 drives both high pressure oil pump 42 and low pressure oil pump 41. Valves (v) are of several types, valves 50, 51 and 57 being check valves, valve 58 being a low pressure control needle valve, and valve 55 being an adjusting valve connected also with gage 56. Valve 49 is a low pressure valve, and valve 43 is mechanically operated by the action of the closing of the safety bar (not shown) in the mold section.

Valves 46 and 54 serve together to control pressure of the oil admitted to cylinder 31 and are operated by solenoids, valve 46 being a three-position valve having driving and return ports, one pressure feed, and one tank line, with a separate solenoid controlling each port, both ports being closed when neither solenoid is energized, and valve 54 being a two-position control valve having two ports controlled by a single solenoid, the driving port reducing to 1000 p.s.i., the return port reducing to 1000 p.s.i. where the line pressure is 1000 p.s.i. A limit switch actuated by the closing of the die plates 90 and 92 of mold 88 energizes the driving solenoid in valve 46 and the solenoid in valve 54 causing oil to be forced on top of hydraulic ram 31a causing ram 31a to move downwardly and, of course, to move injection ram 30 downwardly for a controlled period of time, which is a period of time sufficient to allow the polystyrene in the state of a mobile gel to reach its molding temperature, while said limit switch also simultaneously energizes a solenoid controlling valve 48 so that hydraulically operated valve 34 (34a, 34b) is caused to be closed at the same time, valve 98 (98a, 98b) being held in closed position by solenoid controlling valve 112. An automatically timed switch to start and stop said vacuum pump 102 is also actuated by the closing of the die plates 90 and 92 of mold 88 to start said pump 102 and to stop said pump 102 when the mold cavity is evacuated to a pressure of from about 8.8 p.s.i. to about 9.8 p.s.i. Thus, the polystyrene in its physical state of a mobile gel is confined under pressure of approximately 1000 p.s.i. in accumulation chamber 26 and injection conduit 33, as hereinbefore described, prior to the expansion of the foaming agent at the molding temperature of the polystyrene under the hereinbefore set forth pressure conditions. Ram 30, after the attaining of the molding temperature by the polystyrene, in its continued downward movement, actuates another time limit switch which energizes solenoid controlling valve 112 so that hydraulically operated valve 98 (98a, 98b) is caused to be opened at the same time. Thus, the downward action of ram 30 causes the mobile gel to pass through nozzle 84 at its nozzle orifice 36 into the evacuated mold cavity.

When ram 30 moves to its lowest position in accumulation chamber 26, it actuates another limit switch which energizes a time delay unit arranged so as to deenergize and thusly reposition the solenoid in valve 54 to equalize pressure on the face and back of ram 31a and thusly hold ram 31a in position for a fixed period of time. At the end of said fixed period of time, the time delay unit simultaneously deenergizes the solenoid in valve 48 causing hydraulically operated valve 34 to open, deenergizes the driving solenoid in 46, and energizes the return solenoid in valve 46, and operates a solenoid in valve 47, and a first solenoid in four-way valve 45, causing flow of oil on the face of ram 15a. The result is that plunger 17 is now caused to push the thermoplastic beads into heating chamber 80 so that the warmed or softened thermoplastic material pushes into filling conduit 27 and through orifice 27a into accumulation chamber 26. The oil pressure is maintained to move plunger 17 until the softened or warm material fills accumulation chamber 26 and exerts back pressure on ram 30, which back pressure also forces oil out the oil exhaust T in valve 54. This back pressure phase also tends to compact the thermoplastic material. As this back pressure builds up, it forces ram 30 upwardly to its top position in chamber 26 until a limit switch is actuated deenergizing the first solenoid in valve 45 and the solenoid in valve 47, stopping the forward flow of oil in front of ram 15 and thus halting the motion of plunger 17. Said limit switch simultaneously energizes the second solenoid in valve 45 now causing oil to be forced against the back of ram 15, which causes the plunger to move backwardly until the solenoid is deenergized by plunger 17 tripping a limit switch when it has completed its backward movement.

Platens 94 and 96 and the respective die plates 90 and 92 are arranged so as to be opened or closed by hydraulic ram 44 in cylinder 44a, controlled by solenoid-operated valve 52. The closing of said die plates 90 and 92, after removal of a previously molded object, is the action which both operates the limit switch simultaneously energizing the driving solenoid in valve 46, the solenoid in valve 54, and the solenoid controlling valve 48, and mechanically shuts off safety by-pass valve 33.

Also contemplated within the scope of this invention is the use of an hydraulically operated feed screw in place of loading ram 17 and spreader 20, said screw to be rotatably positioned in chambers 18a and 80, as is clearly apparent from the hereinbefore set forth description.

Also contemplated within the scope of this invention is the use of multi-cavity molds.

Many alterations and changes may be made without departing from the spirit and scope of this invention which is set forth in the appended claims which are to be construed as broadly as possible in view of the prior art.

I claim:

1. A method for injection molding a porous, multi-cellular, solidified foam-like formed structure from a formable thermoplastic resin having a foaming agent incorporated therein; said method comprising: charging the resin through a port into the chamber of a ram type injection molding machine; heating said resin in a first zone of said chamber to a temperature below that temperature at which the resin will foam at atmospheric pressure; actuating a ram of the injection molding machine to seal off the charging port and to force at least a portion of said resin to pass into a second zone of said chamber without expansion of said foaming agent; sealing said second zone from said first zone; heating said composition in said second zone to such temperature that it assumes the physical state of a mobile gel, while at the same time maintaining said composition under such pressure as to prevent expansion of said gel; and causing said gel to expand into a vented mold thereby forming a porous multi-cellular, solidified foam-like structure.

2. An injection molding apparatus comprising, in combination, chamber means for receiving a thermoplastic foamable composition, heating chamber means for softening said composition, said receiving chamber means opening into and being coaxially aligned with said heating chamber means, means for heating said so-softened composition to a mobile gel at the molding temperature of said composition without expansion including means for maintaining a pressure greater than atmospheric pressure, said means for heating said so-softened composition to a mobile gel including an injection chamber, a filling conduit coaxially aligned with and connecting said heating chamber means with said injection chamber, said injection chamber being positioned transversely with respect to said filling conduit, and an injection conduit transversely positioned with respect to said injection chamber, said injection conduit being connected, at one end thereof, to said injection chamber, at the bottom thereof, an injection nozzle connected to said injection conduit at the other end thereof, an injection mold in communication with said nozzle, a double-acting hydraulically operated loading ram axially movable in said receiving chamber means, hydraulically operated injection ram means for moving said mobile gel from said injection chamber and said injection conduit through said nozzle and into said mold, means for maintaining said mold below atmospheric pressure, said injection ram means being positioned in slip-fit relation with said injection chamber at least with respect to its bottom portion, an hydraulically operated valve positioned in said filling conduit at the entry opening thereof, an hydraulically operated valve means for controlling flow of said mobile gel through said nozzle into said mold, and hydraulic control means for operating said loading ram, said injection ram means, and said hydraulically operated valves in timed relation with each other.

References Cited in the file of this patent

UNITED STATES PATENTS

| | | |
|---|---|---|
| 2,420,815 | Cooper et al. | May 20, 1947 |
| 2,829,117 | Lindemann | Apr. 1, 1958 |
| 2,831,214 | Eyles et al. | Apr. 22, 1958 |
| 2,860,377 | Bernhardt et al. | Nov. 18, 1958 |
| 2,885,737 | Whalen et al. | May 12, 1959 |
| 2,950,501 | Harkenrider | Aug. 30, 1960 |
| 2,966,702 | Soubier | Jan. 3, 1961 |
| 2,976,571 | Moslo | Mar. 28, 1961 |
| 3,001,234 | Renier | Sept. 26, 1961 |
| 3,009,888 | Mueller-Tam et al. | Nov. 21, 1961 |
| 3,026,274 | McMillan et al. | Mar. 20, 1962 |
| 3,029,472 | Fischer | Apr. 17, 1962 |
| 3,058,161 | Beyer et al. | Oct. 16, 1962 |

FOREIGN PATENTS

| | | |
|---|---|---|
| 629,668 | Great Britain | Sept. 26, 1949 |

OTHER REFERENCES

Modern Plastics, pages 115 and 202, September 1960.